Nov. 11, 1952 — T. J. DOWLING, SR — 2,617,452
TREE SAWING MACHINE AND SUPPORT THEREFOR
Filed March 16, 1951 — 3 Sheets-Sheet 1
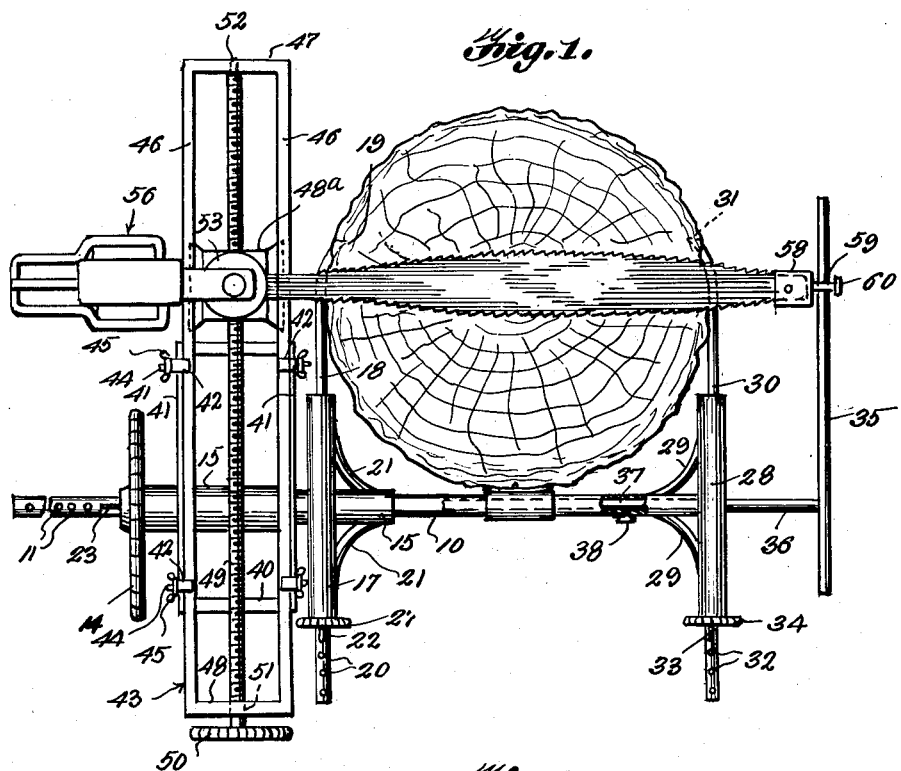
INVENTOR.
THOMAS J. DOWLING, SR.
BY Patrick D. Beavers
ATTORNEY Nov. 11, 1952     T. J. DOWLING, SR     2,617,452
TREE SAWING MACHINE AND SUPPORT THEREFOR
Filed March 16, 1951     3 Sheets-Sheet 2
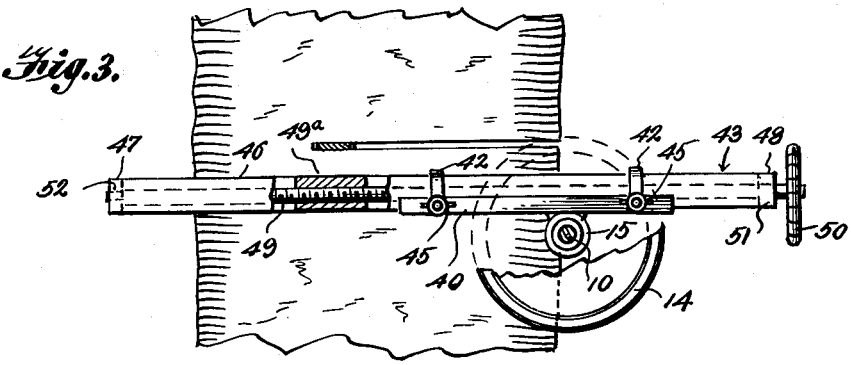
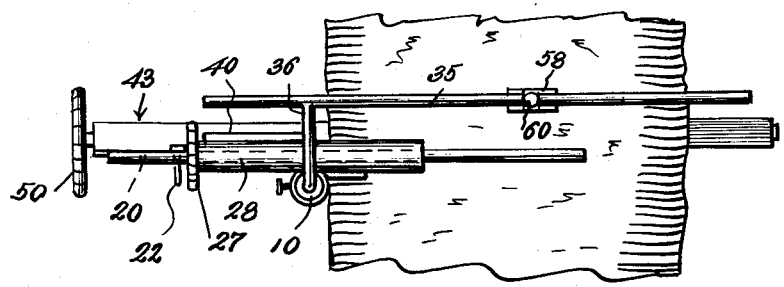
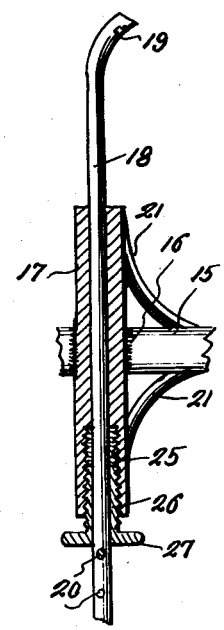
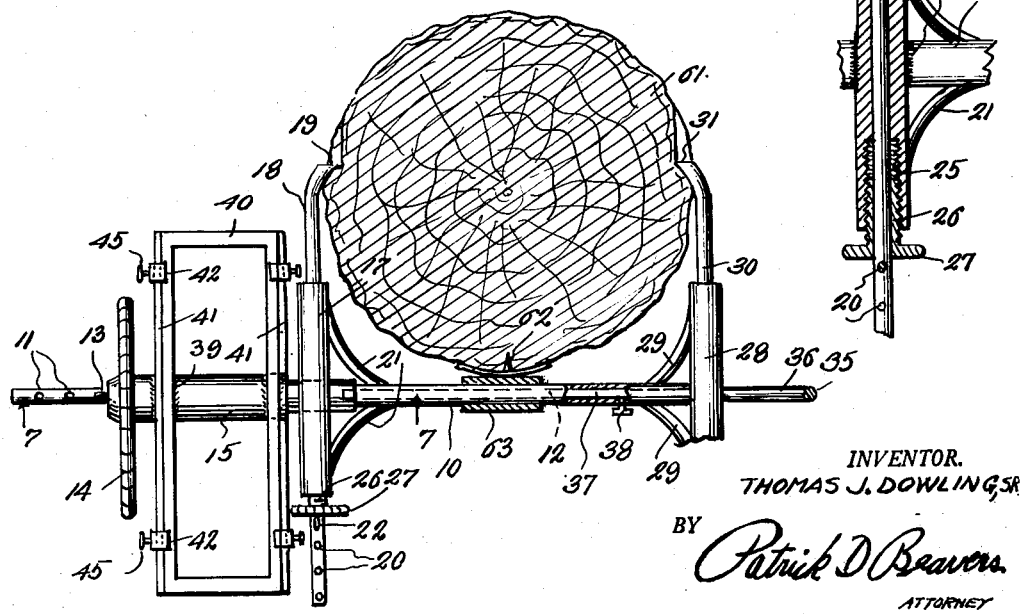
INVENTOR.
THOMAS J. DOWLING, SR.
BY Patrick D. Beavers
ATTORNEY

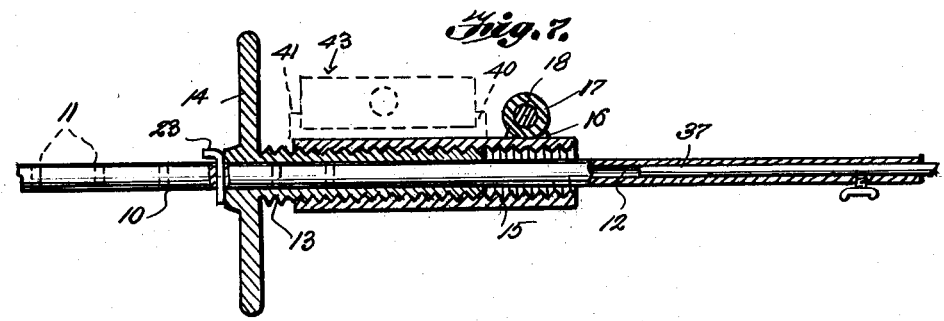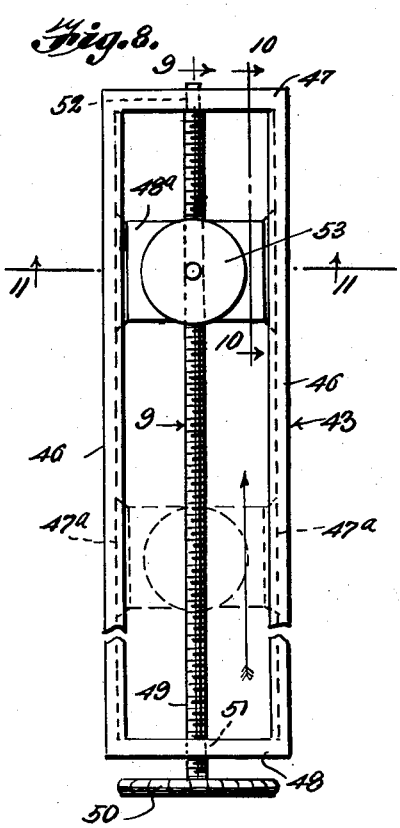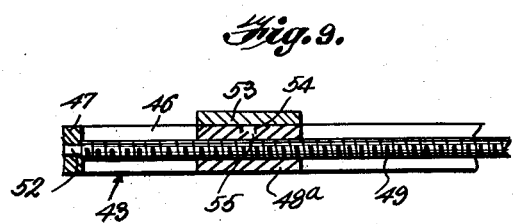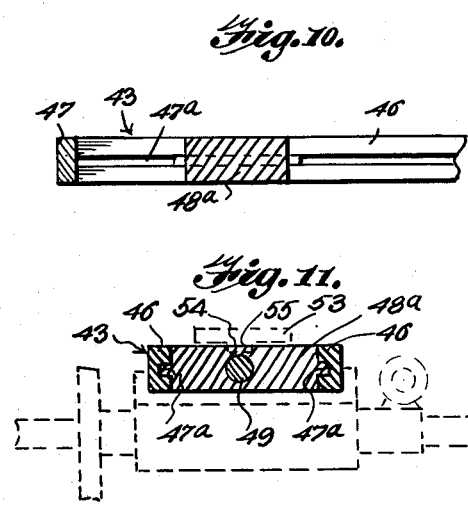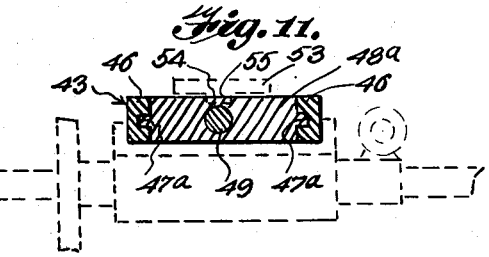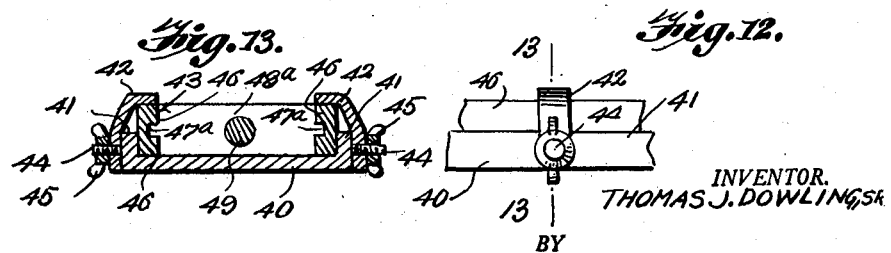

Patented Nov. 11, 1952

2,617,452

UNITED STATES PATENT OFFICE 2,617,452

TREE SAWING MACHINE AND SUPPORT THEREFOR

Thomas J. Dowling, Sr., Seattle, Wash.

Application March 16, 1951, Serial No. 215,925

5 Claims. (Cl. 143—60)

The present invention relates to a tree sawing machine and support therefor and it consists in the combinations, constructions and arrangements of parts herein described and claimed.

Generally there is provided a tree sawing machine and a spider for supporting the same. The spider comprises an elongated frame adjacent one end of which is fixed a perpendicularly and horizontally extending tree-engaging tooth member and adjacent the other end of which is slidably mounted a like member, the latter being actuated toward and away from the fixed member by means of novel gearing. A saw machine support is carried by the frame and novel means is provided for moving the saw during its cutting operation in a horizontal direction away from the longitudinal axis of the frame while at the same time retaining the saw in parallel relation to such frame. The device is light in weight and easily portable by a single person. It contains many novel adjusting features together with an adjustable saw guide.

It is accordingly an object of the invention to provide a device of the character set forth which is simple in construction, relatively inexpensive to manufacture and yet effective and efficient in use.

Another object of the invention is the provision, in an apparatus of the character set forth of novel means for engaging a spider forming a part of the invention with a tree.

Another object of the invention is the provision, in an apparatus of the character set forth, of novel means for supporting a mechanical saw upon a spider forming a part of the invention.

A further object of the invention is the provision, in an apparatus of the character set forth, of novel means for giving relative movement to a saw-supporting device with respect to a spider forming a part of the invention.

Other and further objects of the invention will become apparent from a reading of the following specification taken in conjunction with the drawing, in which:

Figure 1 is a plan view of an embodiment of the invention,

Figure 2 is a side elevational view thereof,

Figure 3 is a sectional view taken substantially along line 3—3 of Figure 2,

Figure 4 is a side elevational view taken from the opposite side to that shown in Figure 2, Figure 5 is a view similar to Figure 1 but showing a saw-supporting mechanism removed therefrom, Figure 6 is an enlarged fragmentary sectional view, partly in elevation, illustrating a tree-engaging tooth forming a part of the invention, Figure 7 is an enlarged sectional view taken substantially along line 7—7 of Figure 5, Figure 8 is a plan view of a saw-supporting platform forming a part of the invention, Figure 9 is a sectional view taken along line 9—9 of Figure 8, Figure 10 is a sectional view taken substantially along line 10—10 of Figure 8, Figure 11 is a sectional view taken along line 11—11 of Figure 8, Figure 12 is a fragmentary side elevational view of a clamp member forming a part of the invention, and Figure 13 is a sectional view taken along line 13—13 of Figure 12.

Referring more particularly to the drawings, there is shown therein an elongated horizontally extending rod 10 provided with a plurality of transversely extending spaced openings 11 at one end portion thereof and being hollowed out, as indicated at 12 in the other end portion thereof. An exteriorly threaded tubular member 13 is slidably mounted upon the rod 10 at that portion thereof adjacent the openings 11 and has integrally formed therewith a hand wheel 14. An interiorly threaded sleeve 15 is threadably engaged with the tubular member 13 and has welded thereto, as indicated at 16, Fig. 7, a transversely extending tubular member 17 in which is longitudinally slidable a rod 18 having a tree-engaging tooth 19 at its outer end and provided with a plurality of transversely extending spaced openings 20 adjacent its other end.

A pair of brace members 21 interconnect the sleeve 15 and the tubular member 17. A pin 22 is adapted to be selectively positioned in the openings 20 and a pin 23 is adapted to be selectively positioned in the openings 11.

That end of the tubular member 17 adjacent the openings 20 in the rod 18 is interiorly threaded, as indicated at 25, Fig. 6, and a collar 26 is threadably engaged therewith. The collar 26 is slidable upon the rod 18 and has integrally formed therewith a hand wheel 27.

A tubular member 28 similar to the member 17 is welded to the rod 10 at the hollowed end thereof and is connected to the rod 10 by means of a pair of brace members 29. A rod 30 is longitudinally slidable in the tubular member 28 and is provided with a tooth 31 at its inner end and with a plurality of spaced transversely extending openings 32 at its outer end in which openings a pin 33 is selectively engageable. The inner end of the member 28 is identical in construction with the inner end of the tubular member 17 and its sleeve corresponding to the sleeve 26 is provided with a hand wheel 34.

A guide bracket is provided and consists of a horizontally extending rod 35 which is mounted upon a curvular outer arm 36 of a base rod 37 which is positioned within the hollow portion 12 of the rod 10 and which may be adjustably locked therein by means of a set screw 38.

Welded, as indicated at 39, to the upper portion of the sleeve 15 is a rectangular transversely extending frame 40 provided with upstanding flanges 41 along its longitudinal edges.

Supported by the frame 40 and adjustably clamped therein by means of a plurality of clamp members 42 is an elongated jig 43 which is of substantially greater length than the frame 40. The clamp members 42 encompass threaded pins 44 which extend outwardly from the flanges 41 and which are provided with wing nuts 45. See Fig. 13.

The jig 43 is of hollow rectangular construction and is provided with a pair of longer sides 46 and a pair of shorter sides 47 and 48. The sides 46 are provided with trackways 47a in their inner faces and a dolly 48a is slidably mounted in such trackways 47a. An exteriorly threaded elongated shaft 49 is provided with a hand wheel 50 at its outer end and is journaled, as indicated at 51, in the member 48 and as indicated at 52 in the member 47 and is threadably connected with the dolly 48a through which it centrally extends. A circular turntable 53 is provided with an integrally dependent pin 54, Fig. 11, centrally upon the underside thereof and the pin 54 extends into a centrally disposed depression 55 in the dolly 48a. A sawing machine generally indicated at 56 is mounted upon the turntable 53 and is provided with a saw blade 57 whose outer end is encompassed by a guide member 58 which is provided with an outwardly extending rod 59 terminating in a knob 60, the rod 59 resting upon the guide rod 35.

In operation, it will be apparent that the tree-engaging spider will first be positioned with respect to a tree 61 in such manner that the teeth 19 and 31 engage opposite sides of such tree while a tooth 62, Fig. 5, carried by a sleeve 63 which is slidably mounted upon the rod 10 between the tubular members 17 and 28, engages another portion of the tree 61 after which the pin 23 is engaged in a suitable opening 11 whereupon the hand wheel 14 is turned to move the sleeve 15 toward the cylindrical member 28 to thereby securely engage the teeth 19 and 31 with the tree 61, to insure the teeth 62 fully engaging the tree 61, the hand wheels 27 and 34 are turned in such manner as to draw the rods 18 and 30 inwardly of the tubular members 17 and 28, respectively, to thereby force the teeth 62 into the tree 61.

When the above operations with the respect to the tree-engaging spider have been completed, the jig 43 may then be clamped into proper position in the frame 40 by means of the clamp members 42, utilizing the wing nuts 45 for such purpose. The sawing machine 56 may then be mounted upon the turntable 53 and the guide bracket 35 may be adjusted by means of the set screw 38 to proper position to support the rod 59. As the saw blade 57 acts to cut the tree 61 the same may be moved inwardly of the tree by manipulating the hand wheel 50 which will, in turn, move the dolly 48a in such manner as to carry the sawing machine 56 and consequently the saw 57 in a path substantially parallel to the longitudinal axis of the rod 10 and away from such rod 10 until the tree is ready to fall whereupon the sawing machine 46 may quickly and easily be detached from the spider to keep the same from being crushed by the falling tree and the remainder of the apparatus, that is to say the tree-engaging spider, will remain affixed to the trunk of the tree until it is ready to use elsewhere.

While but one form of the invention has been shown and described herein, it will be readily apparent to those skilled in the art that many minor modifications may be made without departing from the spirit of the invention or the scope of the appended claims.

What is claimed is:

1. An apparatus of the character described comprising a tree-engaging spider, a support affixed to said spider, a jig releasably engaged on said support, a dolly reciprocally slidable in said jig, a sawing machine releasably mounted upon said dolly, and a saw guide carried by said spider, said spider including an elongated rod, a transversely extending tubular tooth-carrying member affixed to said rod, a second transversely extending tubular tooth-carrying member adjustably carried by said rod, means for tensioning said tooth-carrying members toward each other, teeth longitudinally reciprocal in each of said tooth-carrying members, and means for tensioning said teeth in a direction toward said rod.

2. An apparatus of the character described comprising a tree-engaging spider, a support affixed to said spider, a jig releasably engaged on said support, a dolly reciprocally slidable in said jig, a sawing machine releasably mounted upon said dolly, and a saw guide carried by said spider, said spider including an elongated rod, a transversely extending tubular tooth-carrying member affixed to said rod, a second transversely extending tubular tooth-carrying member adjustably carried by said rod, means for tensioning said tooth-carrying members toward each other, teeth longitudinally reciprocal in each of said tooth-carrying members, means for tensioning said teeth in a direction toward said rod, a tubular sleeve slidable upon said rod between the tooth-carrying members, and a tooth carried by said tubular sleeve.

3. An apparatus of the character described comprising a tree-engaging spider, a support affixed to said spider, a jig releasably engaged on said support, a dolly reciprocally slidable in said jig, a sawing machine releasably mounted upon said dolly, a saw guide carried by said spider, and manual means for reciprocating said dolly in said jig, said spider including an elongated rod, a transversely extending tubular tooth-carrying member affixed to said rod, a second transversely extending tubular tooth-carrying member adjustably carried by said rod, means for tensioning said tooth-carrying members toward each other, teeth longitudinally reciprocal in each of said tooth-carrying members, and means for tensioning said teeth in a direction toward said rod.

4. An apparatus of the character described comprising a tree-engaging spider, a support affixed to said spider, a jig releasably engaged on said support, a dolly reciprocally slidable in said jig, a sawing machine releasably mounted upon said dolly, a saw guide carried by said spider, and manual means for reciprocating said dolly in said jig, said means including a shaft longitudinally journaled in said jig and extending outwardly therefrom, said shaft extending threadably through said dolly, and a handle affixed to the outer end of said shaft, and said spider including an elongated rod, a transversely extending tubular tooth-carrying member affixed to said rod, a second transversely extending tubular tooth-carrying member adjustably carried by said rod, means for tensioning said tooth-carrying members toward each other, teeth longitudinally reciprocal in each of said tooth-carrying members, and means for tensioning said teeth in a direction toward said rod.

5. An apparatus of the character described comprising a tree-engaging spider, a support affixed to said spider, a jig releasably engaged on said support, a dolly reciprocally slidable in said jig, a sawing machine releasably mounted upon said dolly, a saw guide carried by said spider, and manual means for reciprocating said dolly in said jig, said means including a shaft longitudinally journaled in said jig and extending outwardly therefrom, said shaft extending threadably through said dolly, and a handle affixed to the outer end of said shaft, and said spider including an elongated rod, a transversely extending tubular tooth-carrying member affixed to said rod, a second transversely extending tubular tooth-carrying member adjustably carried by said rod, means for tensioning said tooth-carrying members toward each other, teeth longitudinally reciprocal in each of said tooth-carrying members, and means for tensioning said teeth in a direction toward said rod, a tubular sleeve slidable upon said rod between the tooth-carrying members, and a tooth carried by said tubular sleeve.

THOMAS J. DOWLING, Sr.

REFERENCES CITED

The following references are of record in the file of this patent:

UNITED STATES PATENTS

| Number | Name | Date |
|---|---|---|
| 763,112 | Reed | June 21, 1904 |
| 782,101 | Blaisdell | Feb. 7, 1905 |
| 840,314 | Gray et al. | Jan. 1, 1907 |
| 1,132,402 | Starnes | Mar. 16, 1915 |
| 1,335,694 | Norris | Mar. 30, 1920 |
| 1,399,274 | Radimak | Dec. 6, 1921 |
| 1,441,747 | Perkins | Jan. 9, 1923 |
| 1,518,198 | Hearne | Dec. 9, 1924 |
| 1,524,790 | Junke | Feb. 3, 1925 |
| 1,854,111 | Curtis | Apr. 12, 1932 |
| 2,454,992 | Coleman | Nov. 30, 1948 |